(12) United States Patent
Llorens Borrell et al.

(10) Patent No.: US 11,999,529 B2
(45) Date of Patent: Jun. 4, 2024

(54) ROLL-UP BAND AND USE OF THE SAME FOR MANUFACTURING MESH BAGS

(71) Applicant: Girnet Internacional, S.L., Badalona (ES)

(72) Inventors: Carles Llorens Borrell, Barcelona (ES); Luis Miguel Marias Albrich, Barcelona (ES); Judith Díaz Rodríguez, Terrassa (ES); Javier Bueno Salinas, Barcelona (ES); Sergi Cruells Llonch, Sabadell (ES)

(73) Assignee: Girnet Internacional, S.L., Badalona (ES)

( * ) Notice: Subject to any disclaimer, the term of this patent is extended or adjusted under 35 U.S.C. 154(b) by 0 days.

(21) Appl. No.: 17/944,435

(22) Filed: Sep. 14, 2022

(65) Prior Publication Data
US 2023/0082866 A1     Mar. 16, 2023

(30) Foreign Application Priority Data

Sep. 15, 2021 (EP) .................................. 21382831

(51) Int. Cl.
*B65D 30/06* (2006.01)
*B29C 65/48* (2006.01)
(Continued)

(52) U.S. Cl.
CPC .......... *B65D 29/04* (2013.01); *B29C 65/4815* (2013.01); *B31B 70/62* (2017.08);
(Continued)

(58) Field of Classification Search
CPC .... B29C 65/4815; B65D 33/18; B65D 33/002
See application file for complete search history.

(56) References Cited

U.S. PATENT DOCUMENTS 3,598,634 A    8/1971   Kraft
4,403,637 A *   9/1983   Rivelles Sabater .... B65D 29/04
                                                            383/117
(Continued)

FOREIGN PATENT DOCUMENTS

EP   2 078 677 A    7/2009
ES   1 051 865 U   10/2002
(Continued)

OTHER PUBLICATIONS

Badrinas (https://issuu.com/badrinas/docs/badrinas_folleto_innovation_esp, 2013) (Year: 2013).*

(Continued)

*Primary Examiner* — Liam J Heincer
(74) *Attorney, Agent, or Firm* — Sughrue Mion, PLLC

(57) ABSTRACT

The present invention relates to a band (1) that can be stored in reel format, which has areas coated by a thermally-activatable adhesive material (2) following a coating pattern (3) that is repeated along the band with at least two main transversal strips (5a, 5b) that extend between two longitudinal edges (1c) of the band and that include areas (21) coated with a grammage of thermally-activatable adhesive material between 35 and 130 gr/m². A specific use of the band (1) is for making mesh bags (10) and in particular to close a portion of a tubular mesh (11) by interleaving said mesh portion between two coinciding portions of the same or of two bands (1, 1) and with respective main transversal strips (5a, 5a) of the coating pattern (3) towards the mesh; applying pressure; and providing heat.

19 Claims, 5 Drawing Sheets

(51) Int. Cl.
  *B31B 70/62* (2017.01)
  *B31B 70/74* (2017.01)
  *B31B 155/00* (2017.01)
  *B31B 170/20* (2017.01)
  *B65D 33/06* (2006.01)
  *B65D 33/22* (2006.01)

(52) U.S. Cl.
  CPC .............. *B31B 70/79* (2017.08); *B65D 33/06* (2013.01); *B65D 33/22* (2013.01); *B31B 2155/002* (2017.08); *B31B 2170/20* (2017.08)

(56) References Cited

U.S. PATENT DOCUMENTS

| | | | |
|---|---|---|---|
| 2008/0317985 A1* | 12/2008 | Giro Amigo | B32B 27/10 428/317.1 |
| 2009/0116767 A1* | 5/2009 | De Clasca Cabre | B65D 29/04 383/117 |
| 2009/0180717 A1 | 7/2009 | Ferrer | |
| 2009/0181220 A1* | 7/2009 | Giro Amigo | B31D 1/027 428/195.1 |
| 2009/0221408 A1* | 9/2009 | Cope | B29C 66/91431 493/212 |
| 2010/0024358 A1* | 2/2010 | Meseguer Huertas | B65D 31/10 53/550 |
| 2012/0275729 A1* | 11/2012 | Liang | B29C 66/83413 493/239 |
| 2012/0312712 A1 | 12/2012 | Giro Amigo | |
| 2017/0253385 A1* | 9/2017 | Sargin | B65D 31/04 |
| 2018/0327143 A1* | 11/2018 | Johnson | B65D 33/2508 |
| 2019/0308801 A1* | 10/2019 | Marias Albrich | B65D 85/345 |
| 2019/0367258 A1 | 12/2019 | Giro Amigo | |
| 2021/0060888 A1* | 3/2021 | Resch | B65D 33/22 |
| 2022/0089329 A1* | 3/2022 | Forsblom | B65D 75/008 |

FOREIGN PATENT DOCUMENTS

| | | | | |
|---|---|---|---|---|
| ES | 2 188 389 A1 | 6/2003 | | |
| ES | 2 341 929 A1 | 6/2010 | | |
| FR | 2 836 130 A1 | 8/2003 | | |
| KR | 10-0343629 B1 | 9/2002 | | |
| WO | WO-2005102680 A1 * | 11/2005 | ............ | B31B 19/36 |

OTHER PUBLICATIONS

Machine Translation of FR 2836130, 2023 (Year: 2023).*
The Extended European Search Report for 21382831.2, dated Feb. 23, 2022.

* cited by examiner

ROLL-UP BAND AND USE OF THE SAME FOR MANUFACTURING MESH BAGS

CROSS REFERENCE TO RELATED APPLICATIONS

This application claims priority to European Patent Application No. 21382831.2, filed Sep. 15, 2021, the entire contents of which are incorporated herein by reference.

TECHNICAL FIELD OF THE INVENTION

The invention belongs to the field of consumables and in particular relates to a consumable in the shape of a roll-up band especially suitable for use thereof in manufacturing mesh bags for fruit and vegetable products. Therefore, the invention also relates to the particular use of said band for manufacturing mesh bags.

BACKGROUND OF THE INVENTION

Mesh bags made from supplying a tubular mesh and at least one laminar material are widely known.

Techniques for making, filling and closing the bags in the same production process, in an automated manner, are also widely known.

As a result of said production process, closed bags with the product stored inside are obtained, therefore, during said production process, the tubular mesh must be closed at the ends thereof, for which the aforementioned laminar material is used.

Conventionally, the laminar material is used to, by way of a sandwich, interleave the tubular mesh to assist in the closure of the bag. A recurring practice has been and continues to be to join and bond together the facing walls of the mesh by fusing the material that makes up the mesh. The closure of the mesh is made to coincide with a portion thereof that is interleaved between laminar material, which is made to fuse at the same time with the mesh to thus reinforce the closure and prevent tearing of the mesh in this area.

An example of a method and a machine that applies this bag making technique is described in patent document ES 2188389. In this example, the fusion of the materials that make up the mesh and the laminar material is achieved by supplying heat.

The shape of the laminar material and different ways of linking it with the tubular mesh give rise to different bag formats. Thus, for example, the laminar material can be in the shape of a band and be longitudinally juxtaposed on the portion of tubular mesh that forms the bag, connecting the closed ends of the bag. Likewise, the laminar material in the shape of a band can, in addition to bonding to the mesh in the closing areas of the bag, also be bonded to the face of the bag on which it is juxtaposed. Likewise, two bands can be used and each can be juxtaposed on a respective face of the bag, linking in the same way or differently to the associated face. Different bag formats are described, by way of example, in patent documents US20190367258; US20120312712; EP2078677; and ES2341929.

The technique of bonding the materials by fusion, in this case the materials that form the mesh and/or the laminar material, is particularly applicable when plastic materials are used, regardless of whether the fusion is performed by thermo-welding or by alternative means, such as by means of ultrasound.

There is currently a growing interest in replacing plastic materials for materials of renewable origin, materials with recycled material content, bioplastic materials and/or materials that can break down and bioassimilate once the useful life of the products has ended. In short, more sustainable materials.

Within the scope of the present invention, for example, the use of materials for making both the meshes and the laminar material of natural origin, such as cellulose or one of the derivatives thereof, has been explored, in order to ultimately obtain recyclable or compostable bags or more sustainable bags than those made with conventional plastics. These materials are not suitable for applying conventional fusion bonding techniques, since due to the physical-chemical characteristics thereof they are not thermoplastic and this entails having to apply alternative solutions to those of fusion to produce the closure of the bags.

Thermoplastic is understood as a material that at relatively high temperatures becomes deformable or flexible, melts when heated, and hardens when sufficiently cooled. A non-thermoplastic material differs from a thermoplastic material in that it does not melt when raised to high temperatures, but rather burns or degrades, making it impossible to reshape it.

Likewise, the use or significant addition by percentage of recycled plastic materials, such as rPET, also prevents or excessively hinders the application of conventional fusion bonding techniques. Each batch of recycled material has different properties, so it is difficult to ensure the same behaviour under the same conditions of, for example, thermo-fusion, in the bondings between the mesh and/or the laminar material obtained with recycled plastics in addition to the fact that there are recycled plastics that can degrade when melted, so that the mechanical properties of the bags made are not guaranteed, such as the resistance properties that are suitable to support the weight of the products stored in the bag.

A similar problem to that of plastics with recycled content occurs with bioplastic or biopolymer materials. Due to the physical-chemical characteristics thereof, these materials have mechanical properties that provide less performance than conventional plastics, for example when subjected to traditional thermo-fusion techniques. In general, bioplastics either have more critical melting characteristics compared to conventional plastics, making it difficult to find the right temperature and pressure conditions to be able to subject them to thermo-fusion techniques without actually degrading the material and/or require longer execution times to do so; or these biodegradable materials degrade more easily when temperature is applied, which can result in them losing their initial mechanical properties. In any case, with materials of this type, and to try to achieve mechanical properties that can compare to those achieved by using conventional plastics, it is to be expected that the thickness of the elements made up of bioplastics will have to be greatly increased, which, in addition to increasing material costs would not be environmentally sustainable.

The real problem facing the person skilled in the art lies not so much in finding alternative solutions to fusion for bonding the components from which the bags are made, but in how to ensure that these solutions do not negatively alter productivity of the automated methods or of the machines that may be used to put them into practice.

In other words, it is desirable to find a solution to produce the closure of the bags that does not imply giving up the current production rate.

It is also desirable to find a solution to produce the closure of the bags that does not require a total redesign of the means currently used to automate production processes.

Naturally, it is also desirable to find a solution to produce the closure of the bags while maintaining the quality standards of the bags. That is, it is not acceptable to obtain bags the closure of which does not prevent the accidental opening thereof both in the final production phase and during storage, transport, distribution and handling operations by the user before proceeding to the voluntary opening thereof.

The replacement of plastic materials with materials of renewable or natural origin also entails other problems. For the bag format for the manufacture of which laminar materials are used in the shape of a band, and specifically when these connect the closed ends of the bags, said bands, for example made of paper, are more prone to tearing than bands of plastic material. Especially critical areas are located on the lateral edges of the bands, especially when the bands are not linked along the entire length thereof to the mesh. These edges, specifically the free edges thereof, can be particularly delicate and can be tear initiation points. This circumstance is a deterrent to consider paper or a similar material as a replacement for the plastic laminar material in the shape of a band that has been used to make certain bag formats.

Patent document KR 1000343629 describes a bag for containing, among other examples, fruit, the bag being made from a paper mesh. To close the opening of the bag, the use of a sheet of paper material is proposed, although other alternatives are also contemplated, which is folded to offer two faces facing each other with interposition of the mesh. The invention envisages applying a thermally-activatable, spray-applied, adhesive material to the folded sheet of paper and to one or both faces facing the mesh. The thermally-activatable adhesive material is applied in discrete points or areas, by way of "spot welding". Candidates for the proposed thermally-activatable adhesive material include ethylene vinyl acetate (EVA) copolymers; polyolefins (PO); high performance polyamides and polyesters (including thermoplastic polyurethanes (TPU), polyurethanes (PUR)); styrene block copolymers (SBC); prolycaprolactone with soy protein; fluoropolymers, silicone rubbers; and polypyrrole (PPY). By applying heat, the adhesive material enables the facing faces of the paper to bond together through the mesh.

The direct teachings of KR 1000343629 are not compatible with all of the above stated objectives. For example, in the machine described in ES 2188389, the bonding between the mesh and the laminar material, in the shape of two juxtaposed bands each on one side of the tubular mesh, to produce the lower closure of the bag, occurs downstream of an expander core along which said bands are dragged already applied against said sides of the mesh, which does not leave the facing faces thereof accessible for spraying the appropriate amount of thermally-activatable adhesive material. Spraying the thermally-activatable adhesive material in a location upstream of the expander core can cause premature, undesirable bonding between only one band and the facing side of the bag, contamination with adhesive material from parts and components of the machine in contact with the inner face of the mesh through which the adhesive material could slip and other drawbacks. Similarly, a versatile machine, capable of producing bags of different formats, would need different spray points on different parts of the bands, in different amounts, with different spray times, different curing times for the adhesive material and other features that altogether make this solution impractical.

Moreover, the making of bags with paper or similar material is accepted as known. In this case, the teachings of patent document FR2836130 may be of interest, proposing the making of bags from a roll of paper provided with a selective coating of thermally-activatable adhesive material that enables bags to be formed by folding the paper on itself and using said coatings of thermally-activatable adhesive material to bond together portions of the sheet of paper which are applied against each other. In order for the bag to be breathable and to make it suitable for containing fruit and vegetable products, it is contemplated that the sheets of paper have a sort of windows closed by overlapping a mesh. The same coating of thermally-activatable adhesive material will be used for bonding the mesh to the edges of the windows. That is, the thermally-activatable adhesive material will provide the closure seams of the bag, certainly without interposition of mesh, and also the bonding between the sheets of paper and the mesh in the vicinity of the windows.

The bags according to FR2836130 are paper bags, with mesh patches. The sheet of paper used to make it is folded over itself and the finished bag does not have edges of paper material with free edges that could be tear initiation points.

DESCRIPTION OF THE INVENTION

In order to achieve the aforementioned objectives, a band that can be stored in reel format is disclosed according to claim 1.

Said band has areas coated by a thermally-activatable adhesive material following a coating pattern that is repeated along the band, said band having a front face, a rear face and two longitudinal edges, optionally parallel.

It is characteristic that the aforementioned coating pattern, on the same rear face of the band, comprises at least two main transversal strips extending between the two longitudinal edges of the band and including areas coated with a grammage of thermally-activatable adhesive material comprised between 35 and 130 $gr/m^2$, preferably between 45 and 130 $gr/m^2$, more preferably between 60 and 130 $gr/m^2$ and even more preferably between 60 and 100 $gr/m^2$.

This does not rule out the existence of areas coated by a thermally-activatable adhesive material on the front face of the band.

This also does not rule out the existence of other areas coated by a thermally-activatable adhesive material in the coating pattern.

In any event, the grammage range of thermally-activatable adhesive material that can be found in these main transversal strips of the coating pattern of the rear face of the band is astonishing. The grammage far exceeds that required for the coating to perform the functions described, for example, in FR2836130, to form bonding seams between two walls of a sheet of paper, of the same material.

In the band according to the invention, the grammage of thermally-activatable adhesive material that can be found in the coating pattern is designed to close a portion of a tubular mesh by interleaving a portion of said tubular mesh between two portions of the same or of two bands according to the invention with the rear faces thereof oriented towards the mesh and coinciding with two main transversal strips of the coating pattern of said band or bands; the application of pressure; and providing sufficient heat on the front faces of said band or bands to activate the thermally-activatable adhesive material of the main transversal strips and at the same time its flow until it passes through the interleaved mesh in a step of a production process of a mesh bag.

Contrary to expectations, the amount of thermally-activatable adhesive material, that must be, for that purpose, in the coating pattern of the band does not prevent the correct winding and subsequent development thereof around a core; the thermal activation of the amount of thermally-activatable material can be short enough so as to not impair the speed of the manufacturing methods; and the temperature necessary for this can be compatible not only with materials of natural origin that the band and/or the mesh can be made of but also with recycled plastic or bioplastic materials, without degrading them even when the heat source is located in the side of the front face of the band, which is the one that is devoid of the referred coating pattern with thermally-activatable adhesive material.

Indeed, the band can be made of or comprise a material of natural origin, such as cellulose-based and/or cellulose-derived materials, jute, bamboo, sugar cane, cotton, etc.; and/or a plastic material with recycled plastic content, such as rPET; and/or a bioplastic material, such as PLA, PBAT, PHA, etc.

In any case, the band is conceived with a grammage between 40 and 140 $gr/m^2$, which is shown to be adequate to provide the bag with the necessary mechanical characteristics and at the same time does not prevent the winding of the band around a core for storage thereof in reel format, ideal for automating the supply of longitudinal portions of the same to an automatic machine for making mesh bags, with or without assistance for the rotation of the reel.

This particular selection of both materials with natural content and recycled or bioplastic plastics would make the application of fusion bonding techniques of said materials not recommended or even unfeasible. Also contrary to what might be expected, the technical principle of the invention works, that is, satisfactory results are achieved in terms of finish and in terms of execution time, even when the tubular mesh presents folds in the closing area, it is gathered or forms a bundle, that is, even when there are several floors/layers of mesh interleaved between the rear faces of the band or bands, the flow of the thermally-activatable adhesive material is capable of bonding, with interposition of the tubular mesh, the rear faces facing the band or bands.

Also contrary to what might be expected, the same mesh exerts a function of capturing excess thermally-activatable adhesive material, which helps to slow down or attenuate the thermally-activated adhesive material that flows towards the sides of the bag and overflows. As will also be described later, the invention contemplates measures to further promote this anti-overflow effect.

The invention contemplates that the coating pattern, on the same rear face of the band, comprises areas coated with different grammage of thermally-activatable adhesive material, the thermally-activatable adhesive material being able to be the same or different in said areas coated with different grammage of thermally-activatable adhesive material.

In a variant, the two main transversal strips include the areas coated with the highest grammage of thermally-activatable adhesive material of the entire coating pattern.

That is, it is not ruled out as explained later that the coating pattern includes other areas with coating in addition to the main transversal strips, which in one embodiment will have a different purpose for which a lower grammage of thermally-activatable adhesive material is required.

The invention also contemplates the possibility that at least one of the two main transversal strips has areas coated with different grammage of thermally-activatable adhesive material, the areas with a lower grammage of thermally-activatable adhesive material being located concentrated in one or more peripheral areas of the main transversal strip or strips.

In a variant of the invention, the two main transversal strips extend until they reach the two longitudinal edges of the band.

In another variant of the invention, the two main transversal strips do not reach the longitudinal edges of the band and there is a reserve area, without thermally-activatable adhesive material, between each end of the main transversal strips and the closest edge of the band.

According to a variant of the invention, the coating pattern comprises, in addition to the main transversal strips, and on the same rear face of the band in which these are formed, two longitudinal strips coated in a thermally-activatable adhesive material that extend between at least two of said main transversal strips, longitudinal strips which are located in proximity or coinciding with the two lateral edges of the band.

Preferably, the grammage of thermally-activatable adhesive material in these longitudinal strips is less than the grammage of thermally-activatable adhesive material of the main transversal strips, if the grammage is homogeneous in the main transversal strips; or in any case less than the grammage of the area with the highest grammage of thermally-activatable adhesive material of the main transversal strips, if the grammage is not homogeneous in the main transversal strips.

In embodiments of interest, the grammage of thermally-activatable material in the longitudinal strips is comprised between 5 and 30 $gr/m^2$ and preferably between 5 and 20 $gr/m^2$.

As will be explained later with the aid of the Examples, the longitudinal strips may be useful for linking the band to the tubular mesh along a longitudinal portion thereof which will determine a dimension of the bag. However, the inventors have revealed that, ingeniously, these areas of the coating pattern can also provide a reinforcing function of the band, protecting the edges of the band from tearing even when the band is not linked to the tubular mesh, i.e., even when the thermally-activatable adhesive material of these longitudinal strips of the coating pattern is not thermally activated during the production process.

This means that the same consumable, in the form of a band according to the invention the coating pattern of which includes the longitudinal strips, can be used to make bags with different formats, the longitudinal strips performing different functions for each case depending on whether they are thermally activated or not during the making of the bags.

In the event that the longitudinal strips are located in the proximity of the lateral edges of the band, each strip is arranged at a distance of between 2 and 10 mm from the closest edge of the band.

In accordance with another variant of the invention, between the main transversal strips the rear face of the band is entirely coated with thermally-activatable adhesive material; however, it being possible for there to be uncoated reserve areas on the longitudinal edges of the band.

In general, obtaining the band of the invention from a parent band is contemplated, from which longitudinal strips with the desired width are obtained, each strip corresponding to a band like that of the invention. The coating pattern is already applied to the parent band, which means that to obtain bands according to certain embodiments of the present invention, the parent band must be cut through areas that are coated with thermally-activatable adhesive material.

Those variants in which the coating pattern extends but does not reach the lateral edges of the band, in addition to helping to prevent thermally-activated adhesive material from excessively flowing towards the sides of the bag and overflowing, decreases the thickness of the band and facilitates the cutting of the parent band which is precisely cut in coincidence with these uncoated areas. Similar benefits can be obtained when the grammage in the peripheral areas of the coating pattern, either in the main transversal strips or in the longitudinal strips, if any, is less than the grammage of 35 to 130 gr/m² required to bond, through an interposed tubular mesh, two band portions in the closing operation of the tubular mesh during the making of a bag.

According to another aspect of the invention, preferably the viscoelastic properties of the thermally-activatable adhesive material comply with the following:
  softening start temperature between 75 and 110° C.,
  modulus of elasticity C' (storage modulus) having a slope in the softening range between 0.2 and 0.7 MPa/° C., measured using the equipment and conditions as described later in the Test Methodology section,
  modulus of elasticity G' (storage modulus) from 7 MPa to 25 Mpa at a temperature of 30° C. and at 10° Hz in application of a frequency sweep, measured using the equipment and conditions as described later in the Test Methodology section.

More preferably they meet the following:
  softening start temperature between 75 and 90° C.,
  modulus of elasticity G' (storage modulus) having a slope in the softening range between 0.4 and 0.7 MPa/° C., measured using the equipment and conditions as described later in the Test Methodology section:
  modulus of elasticity G' (storage modulus) from 15 MPa to 20 Mpa at a temperature of 30° C. and at 10° Hz in application of a frequency sweep, measured using the equipment and conditions as described later in the Test Methodology section.

In a preferred variant of the band, the front face of the same is coated with a non-stick varnish, preferably a silicone type, the purpose of which is to help prevent the rear face of the band with the coating pattern of thermally-activatable adhesive material from adhering to the front side when the band is wound on itself.

According to another aspect related to the present invention, a method for producing the closure of a portion of a tubular mesh is also disclosed, comprising
  interleaving a portion of tubular mesh between two portions of the same or of two bands according to the invention with the rear faces thereof oriented towards the mesh and coinciding with two main transversal strips of the coating pattern of said band or bands;
  applying pressure; and
  providing heat on the front faces of the band or bands sufficient to activate the thermally-activatable adhesive material of the two main transversal strips and at the same time its flow until it passes through the interleaved mesh.

In a variant of the method, it comprises the selective non-thermal activation of the thermally-activatable adhesive material of the coating pattern in different areas of the main transversal strips.

The method is applicable for the closure of tubular meshes with threads of a material with non-thermoplastic properties and/or comprising materials of natural origin, recycled plastics or bioplastics.

BRIEF DESCRIPTION OF THE DRAWINGS

FIGS. 4a to 8a show alternatives for the coating pattern with thermally-activatable adhesive material;

FIGS. 4b to 8b show bags obtainable using longitudinal portions of bands with the patterns represented in FIGS. 4a to 8a;

DETAILED DESCRIPTION OF THE INVENTION AND EXAMPLES

Figure 1:
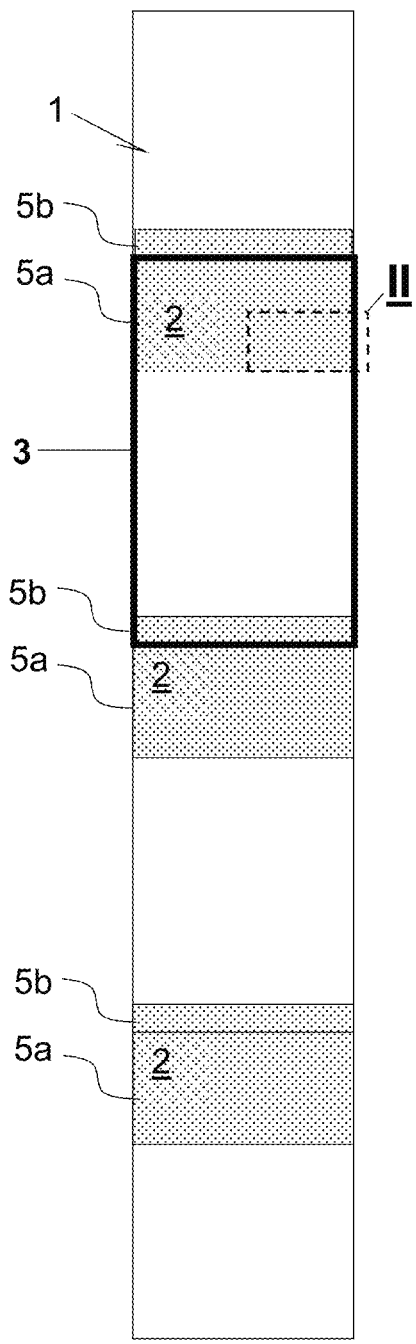
FIG. 1 schematically shows a band according to the invention according to a first embodiment, indicating the coating pattern that is repeated along the length dimension thereof.

FIG. 1 exemplifies a longitudinal portion of a band 1 according to the present invention. The band 1 is specially designed for use thereof in making mesh bags, intended for storing fruit and vegetable products, entirely recyclable and compostable. For this purpose, the band 1 will generally have a width comprised between 75 mm and 145 mm. The exemplary band 1 has longitudinal edges 1c that are straight and parallel to each other.

The band 1 has a front face and a rear face, a view of the rear face thereof having been represented in FIG. 1.

A characteristic of the band 1 is that it has areas coated by a thermally-activatable adhesive material 2 following a coating pattern 3 that is repeated along the band. This coating pattern 3 has been highlighted in a thicker line in the band 1, illustrated developed in FIG. 1. The band 1 is designed to be stored in reel format, wound on itself around a winding core.

As shown in FIG. 1, the coating pattern 3 comprises in the example two main transversal strips 5a, 5b extending between and up to the two longitudinal edges 1c of the band 1. These main transversal strips 5a, 5b include areas 21 (see FIGS. 2a to 2d) coated with a grammage of thermally-activatable adhesive material between 35 and 130 gr/m².

This grammage is significantly higher than that required, for example, to bond together two portions of a band or two bands of the same or similar material to make a bag, for example, for implementing the proposal according to FR2836130. Grammages close to 15-20 gr/m² would suffice for it.

The band 1 of the present invention is designed to be able to bond together two portions of a band or two bands of the same or similar material with the interposition of a tubular mesh, even in the event that the tubular mesh has folds or is gathered, which is common in mesh bag closing operations.

Figure 3:
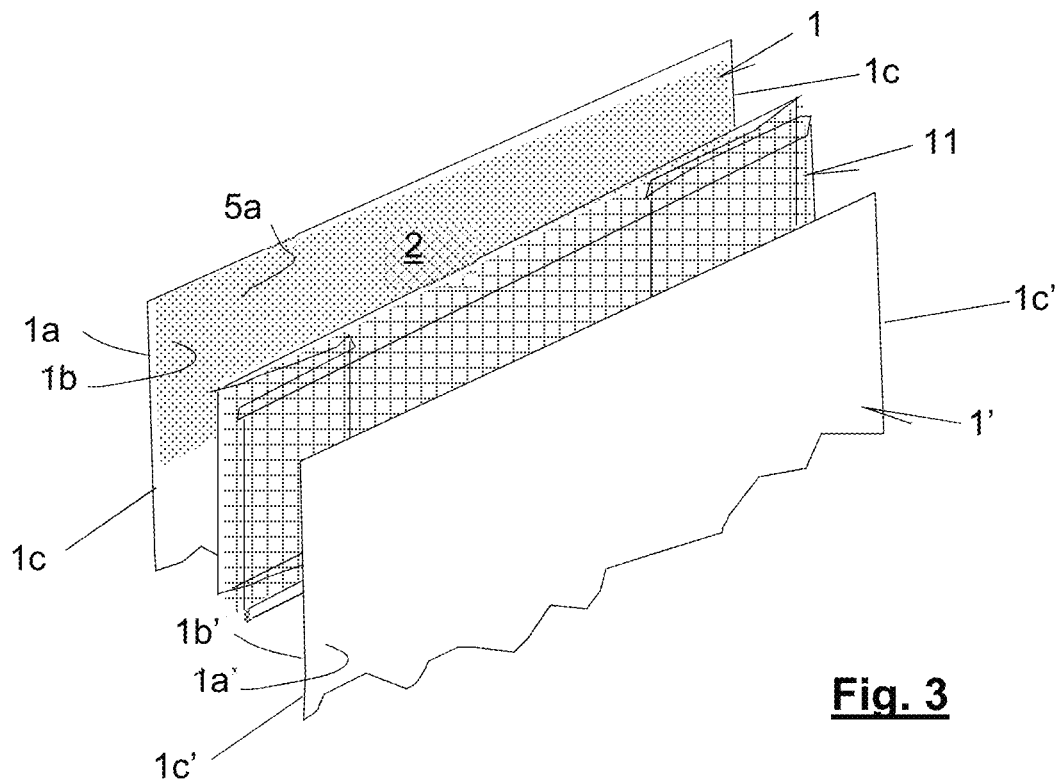
FIG. 3 is a schematic figure to exemplify a use of a band according to the invention, a use that is also the object of the present invention.

FIG. 3 aims to schematically illustrate this bonding operation between two bands 1 and 1' with a tubular mesh 11 interleaved. This bonding operation will cause the closing of the tubular mesh 11 and consequently is an operation that can be carried out in a production process of mesh bags in particular to produce the closure of a portion of tubular mesh 11 used to make said bag.

This method of closing the portion of a tubular mesh 11 comprises interleaving a portion of the tubular mesh 11 between two portions of the same or of two bands 1, 1' like the one in FIG. 1 with the rear faces 1b, 1b' thereof oriented towards the mesh 11 and coinciding with respective main transversal strips 5a, 5a' of the coating pattern 3 of said band or bands; applying pressure; and providing heat on the front faces 1a, 1a' of the band or bands sufficient to activate the thermally-activatable adhesive material 2 of the main transversal strips 5a, 5a' of the rear faces 1b, 1b' of the band or bands and at the same time its flow until it passes through the interleaved mesh 11.

Contrary to expectations, this method can be carried out quickly enough not to alter the production rate of currently known machines that make bags from mesh and plastic bands and that proceed in a similar manner, but providing heat to fuse and bond the layers of the package formed by the two portions of plastic band between which the tubular mesh is interleaved.

Contrary to expectations, this method can also be carried out without damaging the bands, even if they are made of a material of natural origin, such as cellulose, and it is compatible with recycled plastic and bioplastics, obtaining a finish, i.e., a closure of the bags, that is secure.

The proper combination of coating grammage and the viscoelastic properties of the thermally-activatable adhesive material are important to meet the goal of maintaining the production rate.

Therm ally-activatable adhesive materials that are contemplated are hotmelts (solid adhesive) and Heat-seal (water-based or solvent-based adhesive) with certain special characteristics. However, the candidates considered by the expert were found to be invalid.

Far from retreating in our efforts, the performance of different rheological tests has surprisingly allowed the identification of target viscoelastic properties and the selection of valid candidates, as detailed below.

Figure 2A:
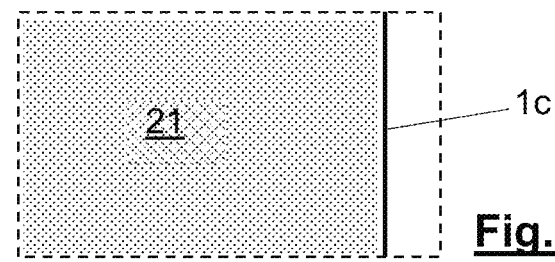
FIGS. 2a to 2d schematically teach different alternatives of coating of thermally-activatable adhesive material of area II of FIG. 1.

In the example of FIG. 1, the main transversal strips 5a and 5b have a homogeneous grammage of thermally-activatable adhesive material 2 and both reach the longitudinal edges 1c of the band 1. FIG. 2a is an enlarged view of area II of FIG. 1.

Figure 2B:
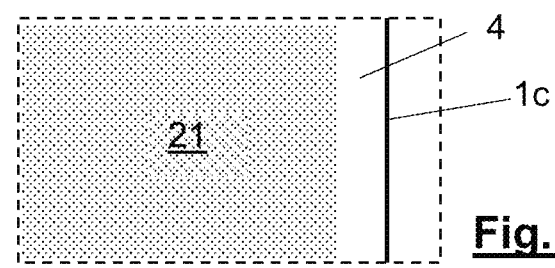
Figure 2C:
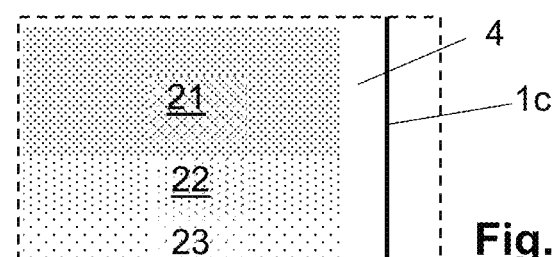
Figure 2D:
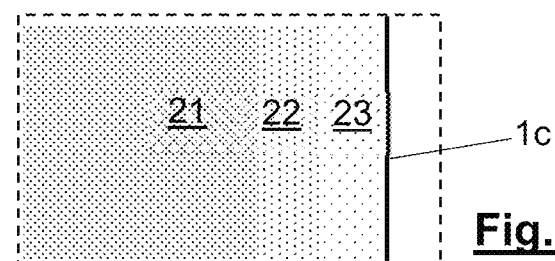

However, the invention contemplates other variants, some of which are exemplified with the aid of FIGS. 2b to 2d, which would come to be enlarged views of this same area II of FIG. 1 but with different coatings to that of FIG. 2a.

In the variant of FIG. 2b, the main transversal strip 5a determines an area 21 with a homogeneous grammage of thermally-activatable adhesive material and this main transversal strip 5a does not reach the longitudinal edges 1c of the band, leaving an aforementioned gap or reserve area 4.

In the variant of FIG. 2c, in the main transversal strip 5a there are several areas 21, 22, 23 with different grammage of thermally-activatable adhesive material and the main transversal strip 5a does not reach the longitudinal edges 1c of the band. In this example, areas 22 and 23, which may be coated with the same or different thermally-activatable adhesive material, are areas with successively lower grammage of thermally-activatable adhesive material than area 21. These areas 22, 23 of lower grammage of thermally-activatable adhesive material are concentrated on the periphery of the main transversal strip 5a, for this case at the lower (and optionally also upper) limit thereof.

In the variant of FIG. 2d, the main transversal strip 5a has several areas 21, 22, 23 with different grammage of thermally-activatable adhesive material and the main transversal strip 5a reaches the longitudinal edges 1c of the band. In this example, areas 22 and 23, which may be coated with the same or different thermally-activatable adhesive material, are areas with successively lower grammage of thermally-activatable adhesive material than area 21. These areas 22, 23 of lower grammage of thermally-activatable adhesive material are concentrated on the periphery of the main transversal strip 5a, in this case at the lateral limits thereof.

The invention proposes that in the coating pattern 3 there are two or more main transversal strips. It is understood that these may have the same or different distribution of thermally-activatable adhesive material and be coated with the same or with different thermally-activatable adhesive materials. To give an example, the different embodiments explained above with reference to the main transversal strip 5a are also applicable for the main transversal strip 5b of the coating pattern 3 of the band 1, or for other added main transversal strips that may have a coating pattern according to the invention.

In any case, these main transversal strips will preferably include the areas coated with the highest grammage of thermally-activatable adhesive material 2 of the entire coating pattern 3, in order to be able to deploy the effect explained above in a method for closing a tubular mesh in the making of mesh bags.

An inhomogeneous weight of thermally-activatable adhesive material and/or a design in which the main transversal strips do not reach the longitudinal edges 1c of the band 1 can contribute to the fact that excess thermally-activatable adhesive material does not drain or overflows outside the bag during the method for closing the same.

The invention contemplates that the coating pattern 3 comprises more than two main transversal strips. The invention also contemplates that on the same rear face 1b of the band 1 in which these main transversal strips are formed, the coating pattern 3 has at least two longitudinal strips that extend between at least two of said main transversal strips, longitudinal strips which can be located in proximity to or in coincidence with the two lateral edges of the band. However, alternative coating patterns 3 to that of FIG. 1 are illustrated in FIGS. 4a to 8a, together with the bag formats that can be obtained from combining these coating patterns 3 with a tubular mesh, illustrated in FIGS. 4b to 8b.

Figure 4A:
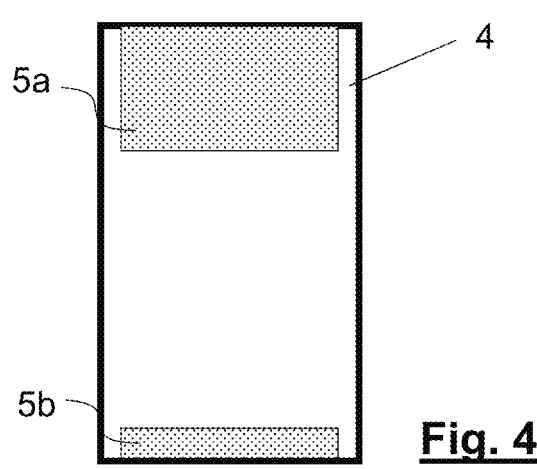
Figure 4B:
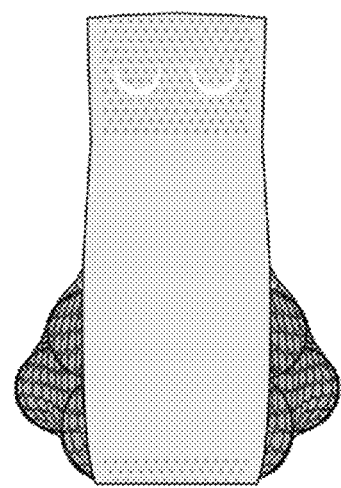

In the variant of FIG. 4a, the main transversal strips 5a, 5b do not reach the edges of the band and there is a reserve area 4 without thermally-activatable adhesive material.

Figure 5A:
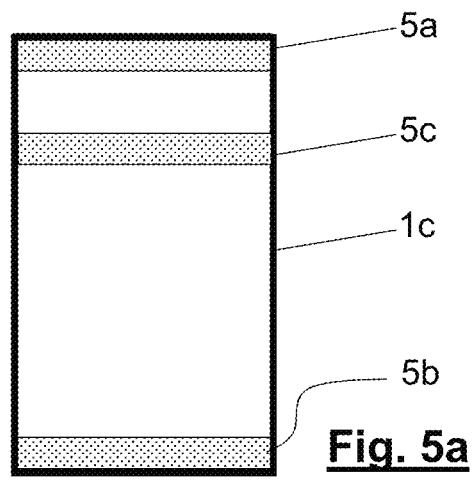

In the variant of FIG. 5a, the coating pattern has three main transversal strips 5a, 5b and 5c reaching the longitudinal edges 1c of the band.

Figure 6A:
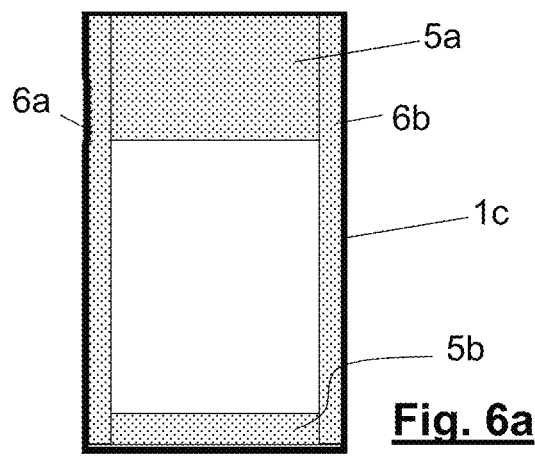
Figure 6B:
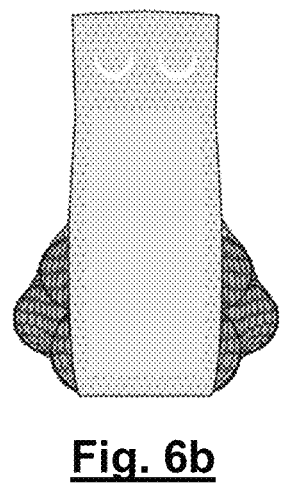

In the variant of FIG. 6a, two main transversal strips 5a, 5b are combined with two longitudinal strips 6a, 6b which extend along the length of the coating pattern 3, and therefore also between the two main transversal strips 5a, 5b. In this example, the longitudinal strips 6a, 6b are located coinciding with the two lateral edges 1c of the strip; and all the coating areas with thermally-activatable adhesive material have a homogeneous distribution and it is the same.

Figure 7A:
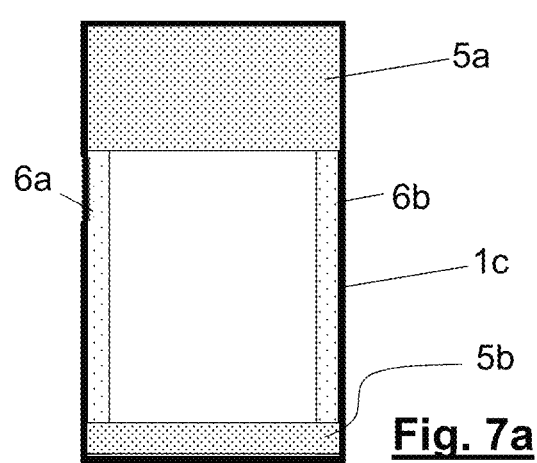
Figure 7B:
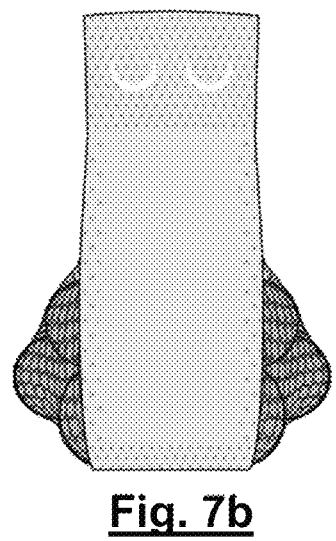

In the variant of FIG. 7a, similar main transversal strips 5a, 5b are combined with longitudinal strips 6a, 6b as in the previous example, but in this case, although all the coating areas with thermally-activatable adhesive material have a homogeneous distribution of the coating grammage in the longitudinal strips 6a, 6b is less than in the main transversal strips 5a and 5b.

Figure 8A:
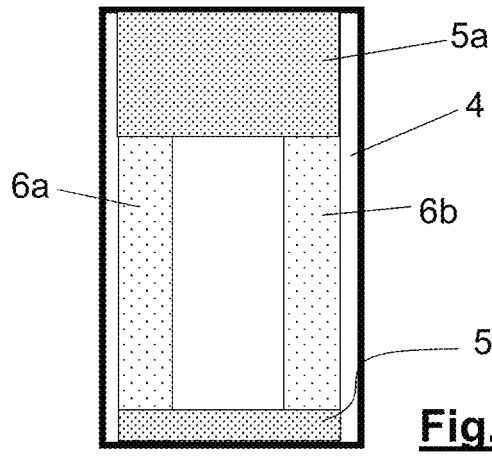
Figure 8B:
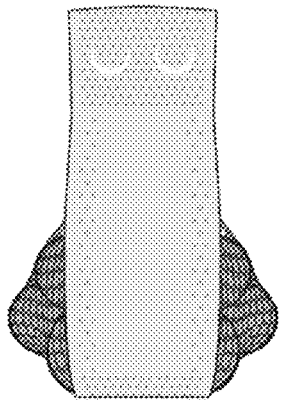

In the variant of FIG. 8a, main transversal strips 5a, 5b are also combined with longitudinal strips 6a, 6b, but in this case the longitudinal strips 6a, 6b are located at a certain distance from the lateral edges 1c of the band 1. Among the different possible options, the example represents one with the coating grammage in the longitudinal strips 6a, 6b that is less than that of the main transversal strips and without reaching the main strips 5a, 5b or the longitudinal strips 6a, 6b the longitudinal edges 1c of the band 1.

The invention also contemplates that between the main transversal strips the rear face of the band is entirely coated with thermally-activatable adhesive material. Alternative coating patterns are illustrated in FIGS. 9 and 10.

Figure 9:
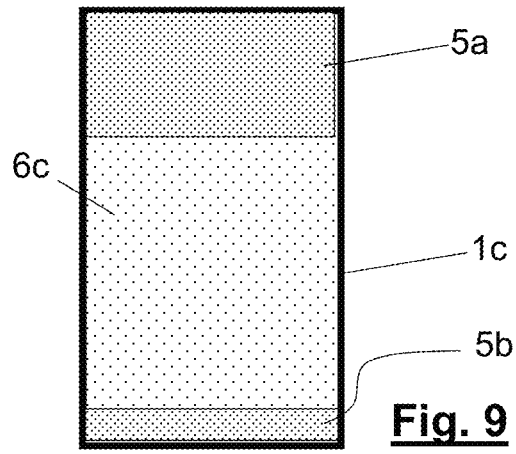
FIGS. 9 and 10 show other alternatives for a coating pattern with thermally-activatable adhesive materials.

The variant of FIG. 9 shares a similar shape and number of main transversal strips 5a, 5b as those of the variant of FIG. 7a, but in this case the entire region 6c comprised between these main transversal strips are coated with thermally-activatable adhesive material. From among the different possible options, in the example of FIG. 9, the coating grammage of this region 6c has been contemplated as less than that of the main transversal strips.

Figure 10:
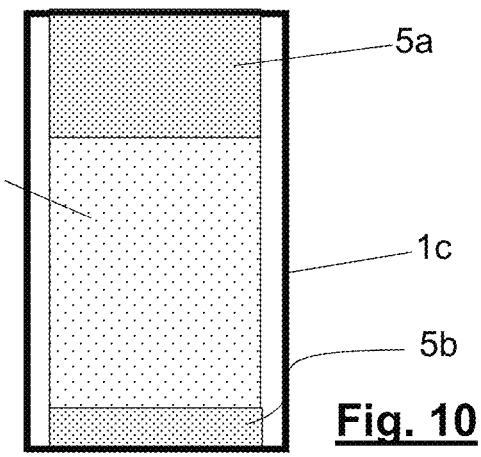

The variant of FIG. 10 shares a similar shape and number of main transversal strips 5a, 5b as those of the variant of FIG. 8a, but in this case a region 6d that extends between these main transversal strips is coated with thermally-activatable adhesive material, in the example, without reaching not only the main strips 5a, 5b but also this region 6d the longitudinal edges 1c of the band 1. From among the different possible options, in the example of FIG. 10, the coating grammage of this region 6d has been contemplated as less than that of the main transversal strips.

Testing Methodology and Disclosure of Valid Candidates

The related tests were rotational rheology tests to find out the behaviour of the thermally-activatable adhesive material subjected to a shear stress, that is, due to shear forces parallel to the material's deformation plane. These stresses are reproduced in a rotational rheometer by means of two parallel plates, one mobile and the other fixed, between which the sample is deposited. A shear is exerted on the sample by rotating the movable portion on the fixed portion. Specifically, the viscoelastic response is monitored, in the present case the modulus of elasticity G', also referred to in the literature as elastic modulus or shear storage modulus.

Figure 11:
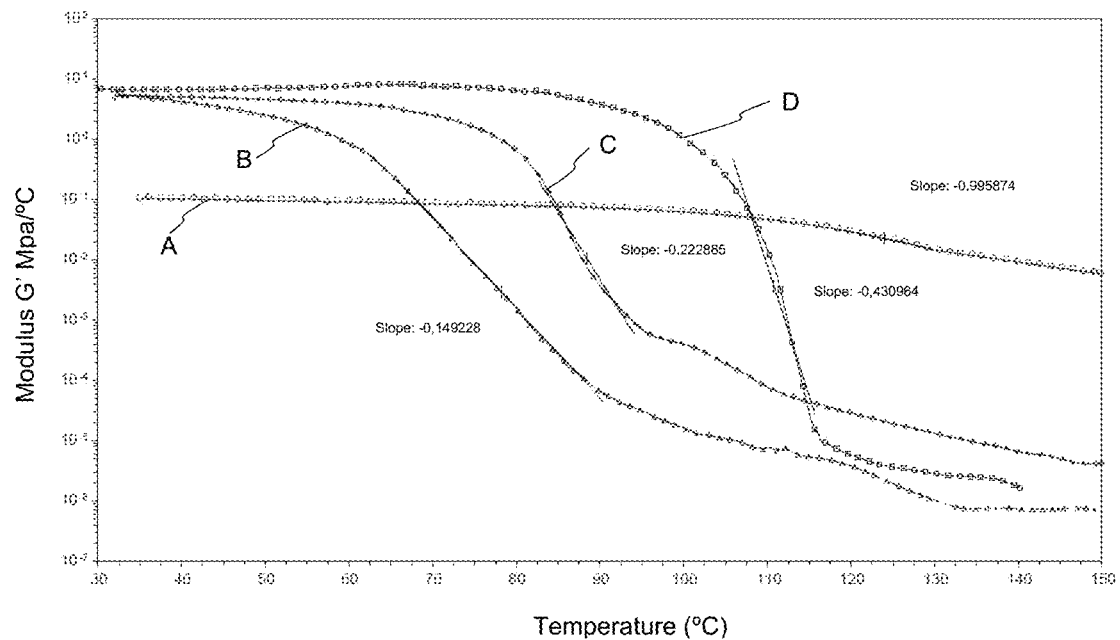
FIG. 11 shows the viscoelastic properties of thermally-activatable adhesive materials as a function of temperature in an oscillatory test including two optimal candidates for implementing the present invention.

FIG. 11 exemplifies some of these tests, showing the modulus of elasticity G' as a function of temperature in this case of four candidates A, B, C and D. The tests were carried out using the following equipment and conditions:

TA equipment AR G2 Instruments, EHP (electrically heated plates) geometry 25 mm in diameter.
Gap between plates≈1 mm
Oscillatory test with temperature ramp from 30 to 150° C., frequency 1 Hz, deformation/amplitude 0.1%, heating rate 2° C./min.

Figure 12:
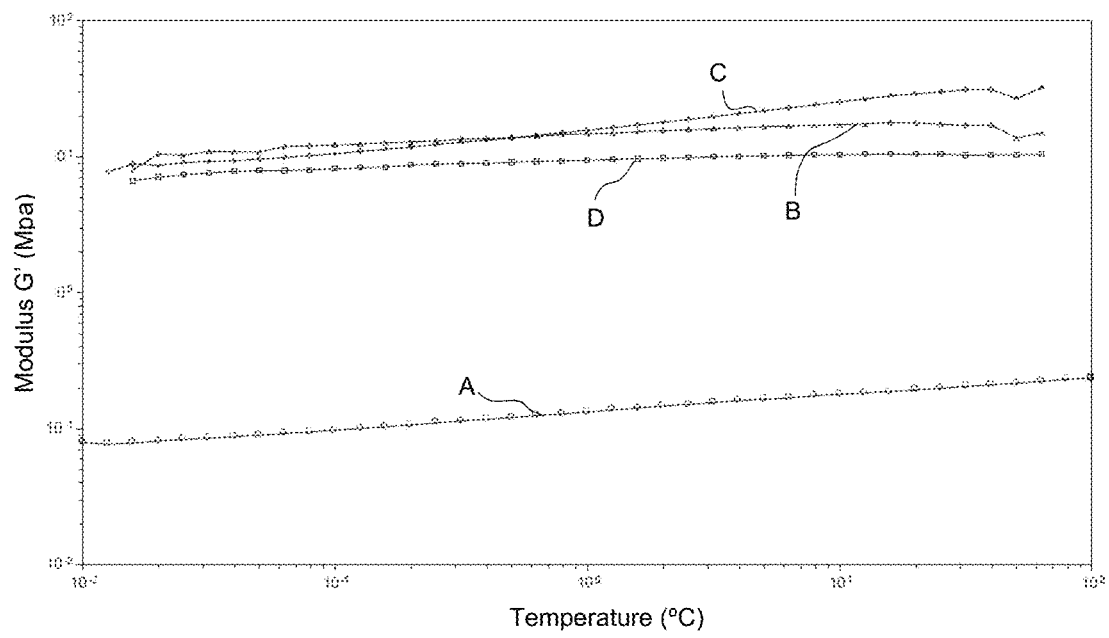
FIG. 12 shows the viscoelastic properties of the same thermally-activatable adhesive materials at an ambient temperature of 30° C. as a function of oscillation frequencies in an oscillatory test.

FIG. 12 exemplifies some of these tests, showing the modulus of elasticity G' in this case at a constant temperature of 30° C. while applying a frequency sweep for the same four candidates A, B, C and D. In this case the tests were carried out using the following equipment and conditions:

TA equipment AR G2 Instruments, EHP (electrically heated plates) geometry 25 mm in diameter.
Distance (Gap) between plates≈1 mm
Oscillatory test with frequency ramp from 0.01 Hz to 10° Hz, deformation/amplitude 0.1%, Constant temperature=30° C.

Unless explicitly mentioned otherwise, the viscoelastic features that are mentioned to claim and exemplify the invention in the variants described herein have been measured using the equipment and conditions as described above.

Candidates C and D of FIGS. 11 and 12 are examples of optimal candidates for implementing the present invention, while candidates A and B would be outside the optimal spectrum of thermally-activatable adhesive materials because there would be no coinciding, among others, of a high enough modulus of elasticity G' at 30° C., which has been proven to result in a rigid adhesive at room temperature in the right measure to find a compromise between the capacity that the band must show for the winding thereof and a lower tack, which does not produce an unwanted bonding of the band on itself when winding itself around a core winding; low softening temperatures so that the adhesive material becomes viscous as soon as possible and begins to perform its adhesive function quickly; and a slope of ascent of the modulus of elasticity G' as vertical as possible, which results in the adhesive material hardening very quickly, thus requiring a shorter time to close the bag.

Not only that, the combination of the thermally-activatable adhesive material with the material that makes up the band 1 must be appropriate and right so that the provision of heat can be carried out on the front faces of the band 1 and transferred to the rear faces to activate the thermally-activatable adhesive material of the main transversal strips 5a, 5a' and at the same time its flow until it passes through the interleaved mesh 11.

Example 1

Two identical bands are used, both made of ARACEL MG Bleached Kraft cellulose material, soft calandred, Water resistance Code 0100-substance-1110, 120 gr/m². The coating pattern corresponds to that of FIG. 4a and comprises two main transversal strips 5a and 5b, the first of 70 mm (to form the gusset or header of a bag) and the second of 30 mm (to form the bottom of the bag) that are used to produce the upper and lower closure, respectively, of a tubular mesh for the case of a cellulosic mesh with a commercial reference: 81356 (CB-92-45-R4-26 GIRCEL D40 WHITE) previously manipulated to produce two opposite and internally oriented folds in order to make a bag like the one illustrated schematically in FIG. 4b.

The aforementioned main transversal strips 5a and 5b are of a homogeneous coating of thermally-activatable adhesive material, the coating having a grammage of 60 gr/m².

The viscoelastic properties that characterise this thermally-activatable adhesive material are as follows:
softening start temperature≈100° C.
modulus of elasticity G' with a slope in the softening range of 0.4 to 0.5 MPa/° C.,
modulus of elasticity G' from 7 to 9 Mpa at temperature 30° C. and 10° Hz in application of a frequency sweep.

A candidate that meets these conditions is HM 589 from the supplier Badrinas.

The coating of thermally-activatable adhesive material has been deposited onto the bands using the hot lip lamination gun technique.

A reserve area is left between the main transversal strips 5a and 5b and the edges 1c of the strip. This reserve area is 4 mm long and this contributes in an effective and verifiable way to prevent the thermally-activated adhesive material from flowing towards the sides of the bag, overflowing and the adhesive material from being laterally detached when applying heat.

The reserve area also contributes to facilitating the longitudinal cuts of a parent reel from which longitudinal strips are obtained that form the bands with the desired width.

To produce the closure of the bag, the package formed by the two bands and the interleaved mesh is formed, a pressure of between 1 and 4 MPa is exerted, preferably between 1.5 and 3 MPa, and for example of 2.5 MPa, on the area in which the bonding is to be made coinciding with the main transversal strips. This pressure is carried out by hold-down plates that are at a temperature between 125 and 200° C., preferably between 135° C. to 165° C., and for example 145° C., which are applied on the front faces of the bands in order to transmit heat to the rear faces coated with the thermally-activatable adhesive material. The duration of the pressure interval can last between 0.1 and 2 seconds, preferably between 0.4 and 1 seconds, and for example 0.6 seconds. Once the pressure is applied, the bonding is kept at rest to wait for it to cool down. The cooling time is of the order of 0.1 seconds.

Example 2

Starting from Example 1, the thermally-activatable adhesive material is replaced by one that has the following viscoelastic properties:

softening start temperature≈85° C.

modulus of elasticity G' with a slope in the softening range of 0.2 to 0.3 MPa/° C., modulus of elasticity G' from 13 to 16 Mpa at a temperature of 30° C. and 10° Hz in application of a frequency sweep.

A candidate that meets these conditions is TECHNOMELT 3656 FR from the supplier HENKEL®.

Likewise, the material for making the band is replaced by STARKRAFT® paper, 100 gr/m².

Likewise, the tubular mesh is replaced by 81380 cellulose mesh (CB-80-45-R4-26 GIRCEL D40 A.LIMON).

To produce the closure of the bag, we proceed as in Example 1.

Example 3

Two equal bands are used, both made of r-PET film (film with 50 to 70% recycled PET) from the supplier SUPERFILM (article code PETLAIN BT 1011 PRY). The rPET film is 23 microns thick. The use of laminated bands is envisaged, each one composed, for example, of two 23 micron rPET films reaching a total thickness of 46 microns per band.

The coating pattern corresponds to that of FIG. 5a and comprises three main transversal strips 5a, 5c and 5b, of 30, 20 and 30 mm, respectively for the main transversal strips 5a and 5c to form the gusset header of a bag and the main transversal strip 5b to form the bottom of the bag.

Figure 5B:
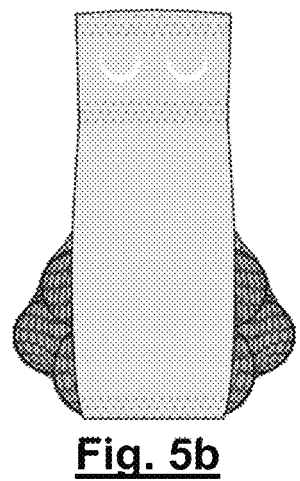

In this case, the main transversal strips extend until they reach the edges of the band and are used to produce the upper and lower closure, respectively, of a tubular mesh woven with rPET Ne21/1 Pre PK yarn from the supplier Textil Santanderina previously manipulated to produce two opposite and internally oriented folds for the purpose of making a bag such as the one illustrated schematically in FIG. 5b.

The aforementioned main transversal strips 5a, 5c and 5b are of homogeneous coating of thermally-activatable adhesive material that is selected HM 589 from the supplier Badrinas, the coating being 80 gr/m².

To produce the closure of the bag, we proceed as in Example 1.

Example 4

Two identical bands are used, both made of ARACEL MG Bleached Kraft cellulose material, soft calandred, Water resistance Code 0100-substance-1110, 120 gr/m². The coating pattern corresponds to that of FIG. 8a and comprises two main transversal strips 5a and 5b, the first of 70 mm (to form the gusset or header of a bag) and the second of 30 mm (to form the bottom of the bag) that are used to produce the upper and lower closure, respectively, of a cellulosic tubular mesh with commercial reference 81356 (CB-92-45-R4-26 GIRCEL D40 WHITE) previously manipulated to produce two opposite and internally oriented folds in order to make a bag like the one illustrated schematically in FIG. 8b.

The aforementioned main transversal strips 5a and 5b are of a homogeneous coating of thermally-activatable adhesive material, the coating having a grammage of 60 gr/m², which is selected with the following viscoelastic properties:

softening start temperature≈80° C.

modulus of elasticity G' with a slope in the softening range of 0.6 MPa/° C., modulus of elasticity G' of 20 Mpa at a temperature of 30° C. and 10° Hz in application of a frequency sweep.

A reserve area is left between the main transversal strips 5a and 5b and the edges 1c of the strip. This reserve area is 4 mm long.

The coating pattern includes respective longitudinal strips 6a, 6b of the same thermally-activatable adhesive material as that used for the main transversal strips and the same reserve area is left, with respect to the associated edges of the band, as in the case of the main transversal bands.

The width of the longitudinal strips 6a, 6b is 15 mm and the grammage of the thermally-activatable adhesive coating is in this case 15 gr/m².

The coating of thermally-activatable adhesive material has been deposited onto the bands using the hot lip lamination gun technique.

To produce the closure of the bag, we proceed as in Example 1, but in this case, in the making of the bag, the thermally-activatable adhesive material of the longitudinal strips is also thermally activated to ensure the individual bonding of each band to a wall of the juxtaposed tubular mesh.

Example 5

Starting from Example 1, the coating pattern further comprises two longitudinal strips 6a, 6b, coinciding with the edges of the band, of the same thermally-activatable adhesive material as that used for the main transversal strips. This coating pattern corresponds to that of FIG. 7a in order to make a bag like the one schematically illustrated in FIG. 7b.

The width of the longitudinal strips 6a, 6b is 5 mm and the grammage of the thermally-activatable adhesive coating is in this case 8 gr/m².

To produce the closure of the bag, we proceed as in Example 1 and in this case, in the making of the bag, the thermally-activatable adhesive material of the longitudinal strips is not thermally activated, longitudinal strips which are detached from the tubular mesh. In this case, the non-thermally activated adhesive material contributes or produces an anti-tear effect on the bands, remember, of cellulose material.

Example 6

Starting from Example 1, the coating pattern further comprises a region 6d that extends between the main transversal strips 5a and 5b. This coating pattern corresponds to that of FIG. 10, the width of the region 6d being the same as that of the main transversal strips and the grammage of the thermally-activatable adhesive coating in this region 6d being 15 gr/m², the thermally-activatable adhesive being able to be the same in all the coated areas of the band.

Example 7

The band of the invention is specially designed to be stored in reel format. For this purpose, it is envisaged that the front face 1a thereof is devoid of a coating with thermally-activatable adhesive material but is coated with a non-stick varnish, the purpose of which is to prevent the rear face of the band with the coating pattern of thermally-activatable adhesive material from adhering to the front face of the band when the band is wound on itself.

By way of example, an overprint varnish applied thoroughly to the front face of the band on the previously printed design, for example by flexography, can be selected. One candidate is SUNCHEMICAL silicone varnish with reference BE-20160™ BZ S/I BOLSAS DTR-008/PR.

The invention claimed is:

1. A band that can be stored in reel format, which has areas coated by a thermally-activatable adhesive material following a coating pattern that is repeated along the band, said band having a front face, a rear face and two optionally parallel longitudinal edges, said band being characterised in that the coating pattern, on the same rear face of the band, comprises at least two main transversal strips that extend between the two longitudinal edges of the band and that include areas coated with a grammage of thermally-activatable adhesive material between 35 and 130 gr/m².

2. The band according to claim 1, characterised in that the coating pattern, on the same rear face of the band, comprises areas coated with different grammage of thermally-activatable adhesive material, the thermally-activatable adhesive material being able to be the same or different in said areas coated with different grammage of thermally-activatable adhesive material.

3. The band according to claim 2, characterised in that the at least two main transversal strips include the areas coated with the highest grammage of thermally-activatable adhesive material of the entire coating pattern.

4. The band according to claim 3, characterised in that at least one of the two main transversal strips includes areas coated with different grammage of thermally-activatable adhesive material, the area or areas with lower grammage of thermally-activatable adhesive material being located concentrated in one or more peripheral areas of the main transversal strip.

5. The band according to claim 1, characterised in that some or all of the main transversal strips do not reach the longitudinal edges (1c) of the band leaving respective reserve areas between the ends of the main transversal band or bands and the closest longitudinal edge of the band.

6. The band according to claim 1, characterised in that the coating pattern comprises, in addition to the main transversal strips and on the same rear face of the band in which they are formed, two longitudinal strips that extend between at least two of said main transversal strips, longitudinal strips which are located in proximity or coinciding with the two lateral edges of the band.

7. The band according to claim 6, characterised in that the grammage of thermally-activatable adhesive material in these longitudinal strips is less than the grammage of thermally-activatable adhesive material of the main transversal strips, if the grammage is homogeneous in the main transversal strips; or in any case less than the grammage of the area with the highest grammage of thermally-activatable adhesive material of the main transversal strips, if the grammage is not homogeneous in the main transversal strips.

8. The band according to claim 6, characterised in that the grammage of thermally-activatable material in the longitudinal strips is comprised between 5 and 30 gr/m².

9. The band according to claim 6, characterised in that the longitudinal strips do not reach the longitudinal edges of the band, leaving a reserve area between them and the closest longitudinal edge between 2 to 10 mm.

10. The band according to claim 1, characterised in that the viscoelastic properties of the thermally-activatable adhesive material meet the following:
softening start temperature between 75 and 110° C.,
modulus of elasticity G' (storage modulus) having a slope in the softening range between 0.2 and 0.7 MPa/° C., measured using the equipment and conditions as described in the Test Methodology section:
modulus of elasticity G' (storage modulus) from 7 MPa to 25 Mpa at a temperature of 30° C. and at $10^0$ Hz in application of a frequency sweep, measured using the equipment and conditions as described in the Test Methodology section.

11. The band according to claim 1, wherein the band is made from a material with non-thermoplastic properties and/or comprises materials of natural origin, recycled plastics or bioplastics, and has a grammage comprised between 40 and 140 gr/m².

12. The band according to claim 11, wherein the band is made from cellulose or a derivative, jute, bamboo, sugar cane or cotton.

13. The band according to claim 1, characterised in that the front face is coated with a non-stick varnish, the purpose of which is to prevent the rear face with the coating pattern of thermally-activatable adhesive material (2) from adhering to the front face of the band when the band is wound on itself.

14. A reel of a band according to claim 1.

15. A method of using a band for making mesh bags and in particular for closing a portion of a tubular mesh by interleaving said portion of said tubular mesh between two portions of the same or two bands according to claim 1 with the rear faces thereof oriented towards the mesh and coinciding with respective main transversal strips of the coating pattern of said band or bands; applying pressure; and providing sufficient heat on the front faces of said band or bands to activate the thermally-activatable adhesive material of the main transversal strips and at the same time its flow until it passes through the interleaved mesh.

16. The method according to claim 15, wherein the tubular mesh is a mesh with threads of a material with non-thermoplastic properties and/or comprises materials of natural origin, recycled plastics or bioplastics.

17. A method for causing the closure of a portion of a tubular mesh, comprising interleaved a portion of tubular mesh between two portions of the same or of two bands according to claim 1 with the rear faces thereof oriented towards the mesh and coinciding with respective main transversal strips of the coating pattern of said band or bands;

applying pressure; and providing heat on the front faces of the band or bands sufficient to activate the thermally-activatable adhesive material of the main transversal strips and at the same time its flow until it passes through the interleaved mesh.

18. The method according to claim 17, characterised in that the tubular mesh is a mesh with threads of a material with non-thermoplastic properties and/or comprises materials of natural origin, recycled plastics or bioplastics.

19. The method according to claim 17, the coating pattern of the band or of at least one of the bands having at least one area coated with thermally-activatable adhesive material not located in the main transversal strips, the method being characterised in that it comprises the non-thermal activation, in a selective manner, of said area.

* * * * *